US007337389B1

(12) United States Patent
Woolf et al.

(10) Patent No.: US 7,337,389 B1
(45) Date of Patent: Feb. 26, 2008

(54) SYSTEM AND METHOD FOR ANNOTATING AN ELECTRONIC DOCUMENT INDEPENDENTLY OF ITS CONTENT

(75) Inventors: Susan D. Woolf, Seattle, WA (US); Andrew Baird, Kirkland, WA (US); Sheng Jiang, Bellevue, WA (US); John L. Beezer, Redmond, WA (US); Darryl E. Rubin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/455,805

(22) Filed: Dec. 7, 1999

(51) Int. Cl.
*G06F 15/00* (2006.01)
*G06F 3/048* (2006.01)
*G06F 7/00* (2006.01)
*G09G 5/00* (2006.01)

(52) U.S. Cl. .................. 715/512; 715/501.1; 715/526; 715/790; 707/102; 345/629

(58) Field of Classification Search ................ 715/512, 715/501.1, 500, 513, 526; 345/619, 629
See application file for complete search history.

(56) References Cited

U.S. PATENT DOCUMENTS

| 5,146,552 | A | | 9/1992 | Cassorla et al. |
| 5,237,648 | A | | 8/1993 | Mills et al. |
| 5,239,466 | A | * | 8/1993 | Morgan et al. ............. 715/512 |
| RE34,476 | E | | 12/1993 | Norwood |
| 5,347,295 | A | | 9/1994 | Agulnick et al. |
| 5,390,138 | A | | 2/1995 | Milne et al. |
| 5,434,929 | A | | 7/1995 | Beernink et al. |
| 5,434,965 | A | | 7/1995 | Matheny et al. |
| 5,471,568 | A | | 11/1995 | Webb et al. |
| 5,559,942 | A | | 9/1996 | Gough et al. |
| 5,572,643 | A | | 11/1996 | Judson |
| 5,623,679 | A | | 4/1997 | Rivette |
| 5,625,833 | A | * | 4/1997 | Levine et al. ............... 715/500 |

(Continued)

FOREIGN PATENT DOCUMENTS

EP        0342838 A      11/1989

(Continued)

OTHER PUBLICATIONS

Hirotsu et al. "Cmew/U—A Multimedia Web Annotation Sharing System", NTT Network Innovation Laboratories—Japan, IEEE, 1999, pp. 356-359.*

(Continued)

*Primary Examiner*—William Bashore
*Assistant Examiner*—Maikhanh Nguyen
(74) *Attorney, Agent, or Firm*—Banner & Witcoff, Ltd.

(57) ABSTRACT

A system, method, and apparatus for annotating an electronic document independently of its content is provided. According to one variation, a tablet and stylus-based computer is programmed with a document browser that permits a user to annotate documents viewed through the browser. The annotations are stored separately from the viewed document pages but are correlated with the pages such that when a previously annotated page is revisited, annotations relating to that page are retrieved and displayed on top of the page as an "ink" layer. Three different annotation modes are possible: ink, highlight, and erase. Each mode can be selected through a user interface supplied through the browser or through controls embedded in a document.

22 Claims, 10 Drawing Sheets

U.S. PATENT DOCUMENTS

| | | | |
|---|---|---|---|
| 5,630,125 A | 5/1997 | Zellweger | |
| 5,632,022 A | 5/1997 | Warren et al. | |
| 5,644,674 A | 7/1997 | Aihara et al. | |
| 5,666,113 A | 9/1997 | Logan | |
| 5,680,636 A * | 10/1997 | Levine et al. | 715/512 |
| 5,682,439 A | 10/1997 | Beernink et al. | |
| 5,687,331 A | 11/1997 | Volk et al. | |
| 5,689,717 A | 11/1997 | Pritt | |
| 5,717,860 A | 2/1998 | Graber et al. | |
| 5,717,879 A | 2/1998 | Moran et al. | |
| 5,719,595 A | 2/1998 | Hoddie et al. | |
| 5,727,129 A | 3/1998 | Barrett et al. | |
| 5,729,687 A | 3/1998 | Rothrock et al. | |
| 5,737,599 A | 4/1998 | Rowe et al. | |
| 5,745,116 A | 4/1998 | Pisutha-Arnold | |
| 5,760,773 A | 6/1998 | Berman et al. | |
| 5,761,485 A | 6/1998 | Munyan | |
| 5,761,683 A | 6/1998 | Logan et al. | |
| 5,784,058 A | 7/1998 | LaStrange et al. | |
| 5,786,814 A | 7/1998 | Moran et al. | |
| 5,790,818 A | 8/1998 | Martin | |
| 5,801,685 A | 9/1998 | Miller et al. | |
| 5,801,687 A | 9/1998 | Peterson et al. | |
| 5,802,516 A | 9/1998 | Shwarts et al. | |
| 5,819,301 A | 10/1998 | Rowe et al. | |
| 5,821,925 A | 10/1998 | Carey et al. | |
| 5,822,720 A | 10/1998 | Bookman et al. | 704/3 |
| 5,826,025 A | 10/1998 | Gramlich | |
| 5,832,263 A | 11/1998 | Hansen et al. | |
| 5,832,474 A * | 11/1998 | Lopresti et al. | 707/2 |
| 5,835,092 A | 11/1998 | Boudreau et al. | |
| 5,838,313 A | 11/1998 | Hou et al. | |
| 5,838,914 A | 11/1998 | Carleton et al. | |
| 5,845,262 A | 12/1998 | Nozue et al. | |
| 5,854,630 A | 12/1998 | Nielsen | |
| 5,860,074 A | 1/1999 | Rowe et al. | |
| 5,862,395 A | 1/1999 | Bier | |
| 5,870,092 A * | 2/1999 | Bedford-Roberts | 715/776 |
| 5,877,757 A | 3/1999 | Baldwin et al. | |
| 5,893,128 A | 4/1999 | Drews et al. | |
| 5,893,132 A | 4/1999 | Huffman et al. | |
| 5,900,876 A * | 5/1999 | Yagita et al. | 715/776 |
| 5,909,207 A * | 6/1999 | Ho | 345/156 |
| 5,918,236 A | 6/1999 | Wical | |
| 5,920,694 A * | 7/1999 | Carleton et al. | 709/205 |
| 5,923,326 A | 7/1999 | Bittinger et al. | |
| 5,924,104 A | 7/1999 | Earl | |
| 5,931,912 A | 8/1999 | Wu et al. | |
| 5,933,139 A | 8/1999 | Feigner et al. | |
| 5,933,140 A | 8/1999 | Strahorn et al. | |
| 5,937,418 A | 8/1999 | Menzel | |
| 5,940,080 A | 8/1999 | Ruehle et al. | |
| 5,948,040 A | 9/1999 | DeLorme et al. | |
| 5,950,214 A | 9/1999 | Rivette et al. | |
| 5,956,034 A | 9/1999 | Sachs et al. | |
| 5,956,048 A | 9/1999 | Gaston | |
| 5,978,818 A | 11/1999 | Lin | |
| 5,982,370 A | 11/1999 | Kamper | |
| 5,983,248 A | 11/1999 | DeRose et al. | |
| 5,986,665 A | 11/1999 | Wrey et al. | |
| 6,011,537 A | 1/2000 | Slotznick | |
| 6,012,055 A | 1/2000 | Campbell et al. | |
| 6,018,334 A | 1/2000 | Eckerberg et al. | |
| 6,018,342 A | 1/2000 | Bristor | 345/840 |
| 6,018,344 A | 1/2000 | Harada et al. | |
| 6,018,742 A | 1/2000 | Herbert, III | |
| 6,025,841 A | 2/2000 | Finkelstein et al. | |
| 6,034,689 A | 3/2000 | White et al. | |
| 6,035,330 A | 3/2000 | Astiz et al. | |
| 6,037,934 A | 3/2000 | Himmel et al. | |
| 6,038,598 A | 3/2000 | Danneels | 709/219 |
| 6,049,812 A | 4/2000 | Bertram et al. | |
| 6,052,514 A | 4/2000 | Gill et al. | |
| 6,054,990 A | 4/2000 | Tran | |
| 6,055,538 A | 4/2000 | Kessenich et al. | |
| 6,064,384 A * | 5/2000 | Ho | 715/839 |
| 6,072,490 A | 6/2000 | Bates et al. | |
| 6,076,917 A | 6/2000 | Wen | |
| 6,081,829 A * | 6/2000 | Sidana | 709/203 |
| 6,091,930 A | 7/2000 | Mortimer et al. | |
| 6,094,197 A | 7/2000 | Buxton et al. | |
| 6,105,044 A | 8/2000 | DeRose et al. | |
| 6,122,649 A | 9/2000 | Kanerva et al. | |
| 6,133,925 A | 10/2000 | Jaremko et al. | |
| 6,141,007 A | 10/2000 | Lebling et al. | |
| 6,144,375 A | 11/2000 | Jain et al. | |
| 6,144,991 A | 11/2000 | England | |
| 6,151,622 A | 11/2000 | Fraenkel et al. | |
| 6,154,771 A | 11/2000 | Rangan et al. | |
| 6,157,381 A | 12/2000 | Bates et al. | |
| 6,163,778 A | 12/2000 | Fogg et al. | 707/10 |
| 6,173,287 B1 * | 1/2001 | Eberman et al. | 707/102 |
| 6,181,344 B1 | 1/2001 | Tarpenning et al. | |
| 6,184,886 B1 | 2/2001 | Bates et al. | |
| 6,195,679 B1 | 2/2001 | Bauersfeld et al. | |
| 6,195,694 B1 | 2/2001 | Chen et al. | |
| 6,199,082 B1 | 3/2001 | Ferrel et al. | |
| 6,205,419 B1 | 3/2001 | Fiedler | |
| 6,205,455 B1 | 3/2001 | Umen et al. | |
| 6,211,871 B1 | 4/2001 | Himmel et al. | |
| 6,229,502 B1 * | 5/2001 | Schwab | 345/1.1 |
| 6,230,171 B1 * | 5/2001 | Pacifici et al. | 715/512 |
| 6,243,071 B1 | 6/2001 | Shwarts et al. | |
| 6,243,091 B1 | 6/2001 | Berstis | |
| 6,266,772 B1 | 7/2001 | Suzuki | 713/182 |
| 6,271,840 B1 | 8/2001 | Finseth et al. | |
| 6,272,484 B1 | 8/2001 | Martin et al. | |
| 6,279,005 B1 | 8/2001 | Zellweger | |
| 6,279,014 B1 * | 8/2001 | Schilit et al. | 715/512 |
| 6,281,986 B1 * | 8/2001 | Form | 358/403 |
| 6,289,126 B1 | 9/2001 | Ishisaka | |
| 6,289,362 B1 | 9/2001 | Van Der Meer | |
| 6,301,590 B1 | 10/2001 | Siow et al. | |
| 6,320,169 B1 | 11/2001 | Clothier | |
| 6,320,577 B1 * | 11/2001 | Alexander | 345/440.1 |
| 6,321,244 B1 | 11/2001 | Liu et al. | |
| 6,331,866 B1 | 12/2001 | Eisenberg | |
| 6,331,867 B1 | 12/2001 | Eberhard et al. | |
| 6,340,980 B1 * | 1/2002 | Ho | 715/776 |
| 6,356,287 B1 | 3/2002 | Ruberry et al. | |
| 6,369,811 B1 * | 4/2002 | Graham et al. | 345/764 |
| 6,370,497 B1 | 4/2002 | Knowles | 704/1 |
| 6,377,983 B1 | 4/2002 | Cohen et al. | |
| 6,389,434 B1 * | 5/2002 | Rivette et al. | 715/512 |
| 6,393,422 B1 | 5/2002 | Wone | |
| 6,397,264 B1 | 5/2002 | Stasnick et al. | |
| 6,405,221 B1 | 6/2002 | Levine et al. | |
| 6,407,757 B1 * | 6/2002 | Ho | 715/776 |
| 6,418,421 B1 | 7/2002 | Hurtado et al. | |
| 6,421,065 B1 | 7/2002 | Walden et al. | |
| 6,425,525 B1 | 7/2002 | Swaminathan et al. | |
| 6,437,793 B1 | 8/2002 | Kaasila | |
| 6,437,807 B1 | 8/2002 | Berquist et al. | |
| 6,446,110 B1 | 9/2002 | Lection et al. | |
| 6,457,013 B1 | 9/2002 | Saxton et al. | 707/101 |
| 6,460,058 B2 | 10/2002 | Koppolu et al. | |
| 6,484,156 B1 | 11/2002 | Gupta et al. | |
| 6,486,895 B1 * | 11/2002 | Robertson et al. | 715/776 |
| 6,490,603 B1 | 12/2002 | Keenan et al. | |
| 6,529,920 B1 | 3/2003 | Arons et al. | |
| 6,535,294 B1 | 3/2003 | Arledge, Jr. et al. | |
| 6,539,370 B1 | 3/2003 | Chang et al. | |
| 6,549,220 B1 | 4/2003 | Hsu et al. | |
| 6,549,878 B1 | 4/2003 | Lowry et al. | |

| | | |
|---|---|---|
| 6,560,621 B2 | 5/2003 | Barile |
| 6,571,211 B1 | 5/2003 | Dwyer et al. |
| 6,571,295 B1 * | 5/2003 | Sidana .................. 709/246 |
| 6,573,907 B1 * | 6/2003 | Madrane .................. 715/719 |
| 6,585,776 B1 | 7/2003 | Bates et al. .............. 715/501.1 |
| 6,636,238 B1 | 10/2003 | Amir et al. |
| 6,647,534 B1 | 11/2003 | Graham .................. 715/526 |
| 6,662,310 B2 | 12/2003 | Lopez et al. |
| 6,687,878 B1 * | 2/2004 | Eintracht et al. .......... 715/512 |
| 6,697,997 B1 | 2/2004 | Fujimura .............. 715/501.1 |
| 6,710,790 B1 | 3/2004 | Fagioli |
| 6,714,214 B1 | 3/2004 | DeMello |
| 6,760,884 B1 | 7/2004 | Vertelney et al. |
| 6,772,139 B1 | 8/2004 | Smith |
| 6,788,316 B1 | 9/2004 | Ma et al. |
| 6,871,318 B1 * | 3/2005 | Wynblatt et al. ......... 715/500.1 |
| 2001/0031128 A1 | 10/2001 | Manbeck |
| 2002/0097261 A1 | 7/2002 | Gotturcht et al. |
| 2002/0099552 A1 | 7/2002 | Rubin et al. |
| 2002/0194260 A1 | 12/2002 | Headley et al. |
| 2005/0060138 A1 | 3/2005 | Wang et al. |

FOREIGN PATENT DOCUMENTS

| | | |
|---|---|---|
| EP | 0 822 501 A1 * | 2/1998 |
| EP | 0 902 379 A2 | 3/1999 |
| WO | WO 87/01481 | 3/1987 |
| WO | WO 96/20908 | 7/1996 |
| WO | WO 97 22109 A | 6/1997 |
| WO | WO 98/06054 | 2/1998 |
| WO | WO 98/09446 | 3/1998 |
| WO | WO 99/49383 | 9/1999 |

OTHER PUBLICATIONS

Kuo et al. "A Synchronization Scheme for Multimedia Annotation", Multimedia Information NEtworking Laboratory, Tamkang University—Taiwan, IEEE, 1997, pp. 594-598.*

Landay et al., "Making Sharing Pervasive: Ubiquitous Computing for Shared Note Taking," IBM Systems Journal, vol. 38, No. 4, 1999, pp. 531-550.*

Landay, J. A., "Using Note-Taking Appliances for Student Collaboration," 29th Annual Frontiers in Education Conference, IEEE Computer Society, Nov. 1999, p. Session 12C4/15-12C4/20.*

P. Chiu et al., "NoteLook: Taking Notes in Meetings with Digital Video and Ink", ACM Mulitmedia'99, Oct. 1999, pp. 149-158.*

Crespo, Chang, Bier: Computer Networks and ISDN Systems "Responsive interaction for a large Web application: the meteor shower architecture in the WebWriter II Editor", 1997, pp. 1508-1517.

Schilit and Price: "Digital Library information Appliances", ACM Conference on Digital Libraties, Jun. 23, 1992, pp. 217-226.

Graefe, et al: "Designing the muse: A Digital Music Stand for the Symphony Musician", Proc. of Conf on Human Factors In Computing Systems, Apr. 13-18, 1996, pp. 436-441.

Softbook® Press The Leader in Internet-Enabled Document Distribution and Reading Systems; http://www.softbook.com/consumer/reader.asp.

Rocket eBook Using the Rocket eBook; http://www.rocketbook.com/Products/Faq/using.html.

Explore the Features of the Rocket eBook; wysiwyg://212http://www.rocketbook.com/Products/Tour/Index.html.

"Hucklefine Defined", Apr. 1990, "http://www.ylem.org/artists/mmosher/huck.html", pp. 1-3.

"Tour of Korea Hypercard Stack", 1996, Grose Educational Media, "http://www.entrenet.com/~groedmed/kor2.html", pp. 1-2.

Bizweb2000.com—screenshots of an e-book, published on May 1999, pp. 1-4 "http://web.archive.org/web/*/http://www.bizweb2000.com/eshots.htm".

Greenberg, Saul, "A Fisheye Text Editor for Relaxed-WYSIWIS Groupware", Chi 1996 Proceedings, pp. 1 to 5.

Marshall, C., "Annotation from paper books to the digital library," ACM International Conf. on Digital Libraries, 1997, pp. 131-140.

"Joke eBook," Jul. 1998, PrimaSoft PC, Inc., Electronic Book Series Version 1.0, pp. 1-5.

Munyan, D., "Everybook, Inc: Developing the E-Book in Relation to Publishing Standards," Sep. 1998, http://www.futureprint.kent.edu/articles/munyan01.htm, pp. 1-7.

C. Marshall, "Annotation from paper books to the digital library," ACM International Conf. on Digital Libraries, 1997, pp. 131-140.

D. Munyan, "Everybook, Inc: Developing the E-Book in Relation to Publishing Standards." Sep. 1998, http://www.futureprint.kent.edu/articles/munyan0.1htm, pp. 1-7.

Adobe Acrobat 3.0 Review, downloaded from <http://www.hmug.org/Reviews/>, reviewed Mar. 1997, pp. 1-18.

* cited by examiner

SYSTEM AND METHOD FOR ANNOTATING AN ELECTRONIC DOCUMENT INDEPENDENTLY OF ITS CONTENT

TECHNICAL FIELD

This invention relates generally to document browsers and pages that are displayed using such browsers. More particularly, the invention provides a method and apparatus for allowing a user to add annotations and other markings to an electronic document independently of the content of the document.

BACKGROUND OF THE INVENTION

Web browsers are conventionally used to display documents created with a standard descriptive language such as Hyper Text Markup Language (HTML). Documents written in such languages can be displayed with various visual and audio effects such as color, animation, sound effects, and the like. The documents may include text, bitmap images, graphics, and other types of content.

Web browsers (or, more generally, "document browsers") typically provide functions which permit a user to advance forward and backward among a series of related pages; to jump to a specified page; to jump to pages that are referenced via a so-called "hyperlink" embedded in a page; and to maintain a list of recently viewed pages. Although frequently used to navigate through web pages on the Internet, document browsers can be used to display pages that reside on a local area network or even a local computer on which the browser executes.

Recently, as computers have become smaller, it has become possible to run browsers on notebook computers, palm-sized computers, and so-called "tablet and stylus" computers. The latter devices typically comprise a thin computer roughly the size of a sheet of paper with a large writing surface that doubles as a display, and a stylus that substitutes for a keyboard. A user can display and edit documents using the stylus as a writing instrument.

One potential application for such hand-held computers is the display of mass-produced documents such as books, maps, and other descriptive material. For example, a user who purchases a textbook or fictional work on a CD-ROM or other medium can display the work using a small computer such as a tablet-based computer.

In some instances, a user may want to annotate or otherwise mark pages displayed on the computer. Using a conventional word processing program, a user can rearrange text, highlight certain words or phrases, or delete portions of the text. Such features require that the user have access to the underlying content (e.g., the descriptive material that forms the work). In the case of copyrighted materials, however, editing capabilities may not be available to modify the underlying materials. Certain text may be copy-protected or otherwise unavailable for editing using normal editing tools, or may not be in a format suitable for word processing. In such circumstances, there may be no practical way for a user to annotate such works. As one example, a student viewing a copy-or edit-protected textbook on a tablet-based computer may have no practical way of making notes directly in the textbook. Such a feature would be desirable notwithstanding the copy protection or unavailability of general editing functions for the document.

SUMMARY OF THE INVENTION

The present invention provides a method and apparatus for users to annotate documents in a document browser without changing the contents of the documents. According to one variation of the invention, a tablet and stylus-based computer is programmed with a document browser that permits a user to annotate documents that are viewed through the browser. The annotations are stored separately from the viewed document pages but are correlated with the pages such that when a previously annotated page is revisited, annotations relating to that page are retrieved and displayed on top of the page as an "ink" layer.

According to one variation of the invention, three different annotation modes are provided: ink, highlight, and erase. Each mode can be selected through a user interface supplied through the browser or through controls embedded in a document. The annotation functions can be implemented as an Active-X® control, as an Applet, or as dedicated code integrated into the browser. Other features and advantages of the invention will become apparent through the following description, the figures, and the appended claims.

DETAILED DESCRIPTION OF THE INVENTION

Figure 1:
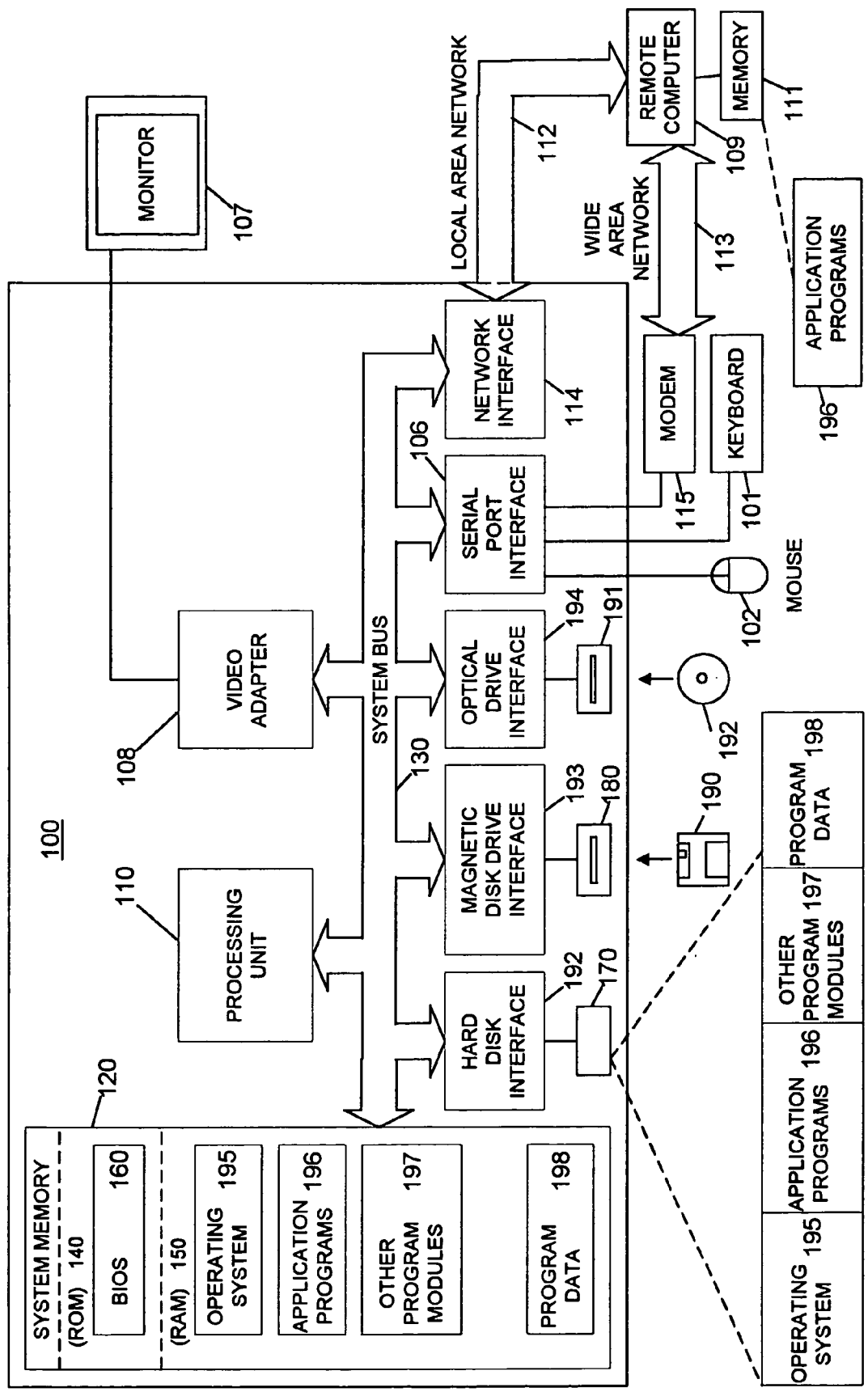
FIG. 1 shows a conventional general-purpose computing environment that can be employed in various embodiments of the invention.

FIG. 1 is a schematic diagram of a conventional general-purpose digital computing environment that can be used to implement various aspects of the invention. Computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory includes read only memory (ROM) 140 and random access memory (RAM) 150.

A basic input/output system 160 (BIOS), containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, game port or a universal serial bus (USB). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
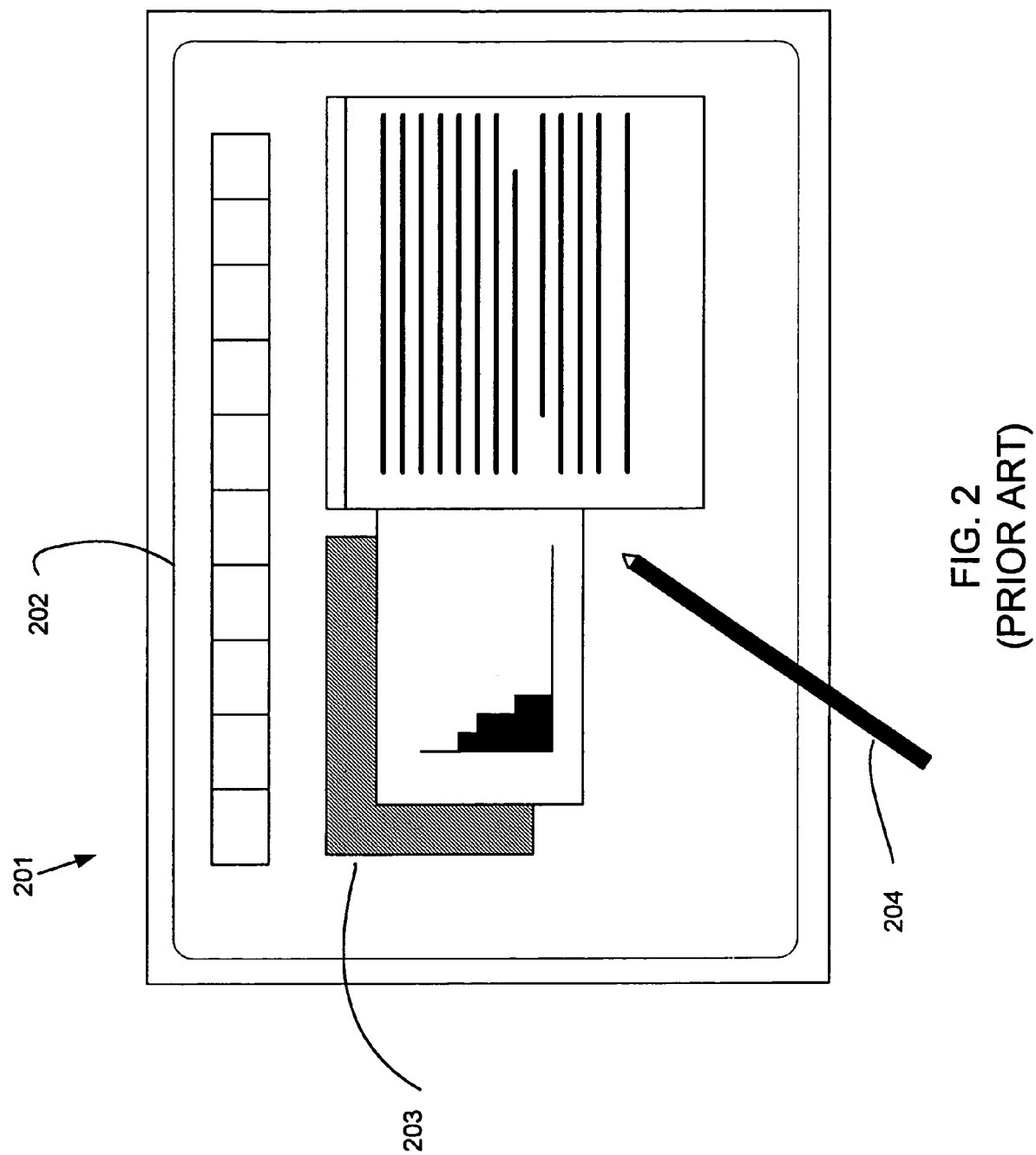
FIG. 2 shows a conventional tablet and stylus-based computer that can be used according to one aspect of the invention.

FIG. 2 shows a tablet and stylus computer that can be used in accordance with various aspects of the present invention. Any or all of the features, subsystems, and functions in the system of FIG. 1 can be included in the computer of FIG. 2. Computer 201 includes a large display surface 202 (e.g., a flat panel display) on which a plurality of windows 203 is displayed. Using stylus 204, a user can select, highlight, and write on the display area. Computer 201 interprets marks made using stylus 204 in order to manipulate data, enter text, and execute conventional computer application tasks such as spreadsheets, word processing programs, and the like. One commercially available tablet and stylus computer incorporating many of these features is the Stylistic 2300 computer sold by Fujitsu Personal Systems, Inc., of Santa Clara, Calif.

A stylus could be equipped with buttons or other features to augment its selection capabilities. In one embodiment, a stylus could be implemented as a "pencil" or "pen" in which one end constitutes a writing portion and the other end constitutes an "eraser" end which, when moved across the display, indicates that portions of the display are to be erased. Other types of input devices such as a mouse, trackball, or the like could be used. Additionally, a user's own finger could be used to select or indicate portions of the displayed image on a touch-sensitive or proximity-sensitive display. Consequently, the term "user input device" is intended to have a broad definition and encompasses many variations on well-known input devices.

Figure 3:
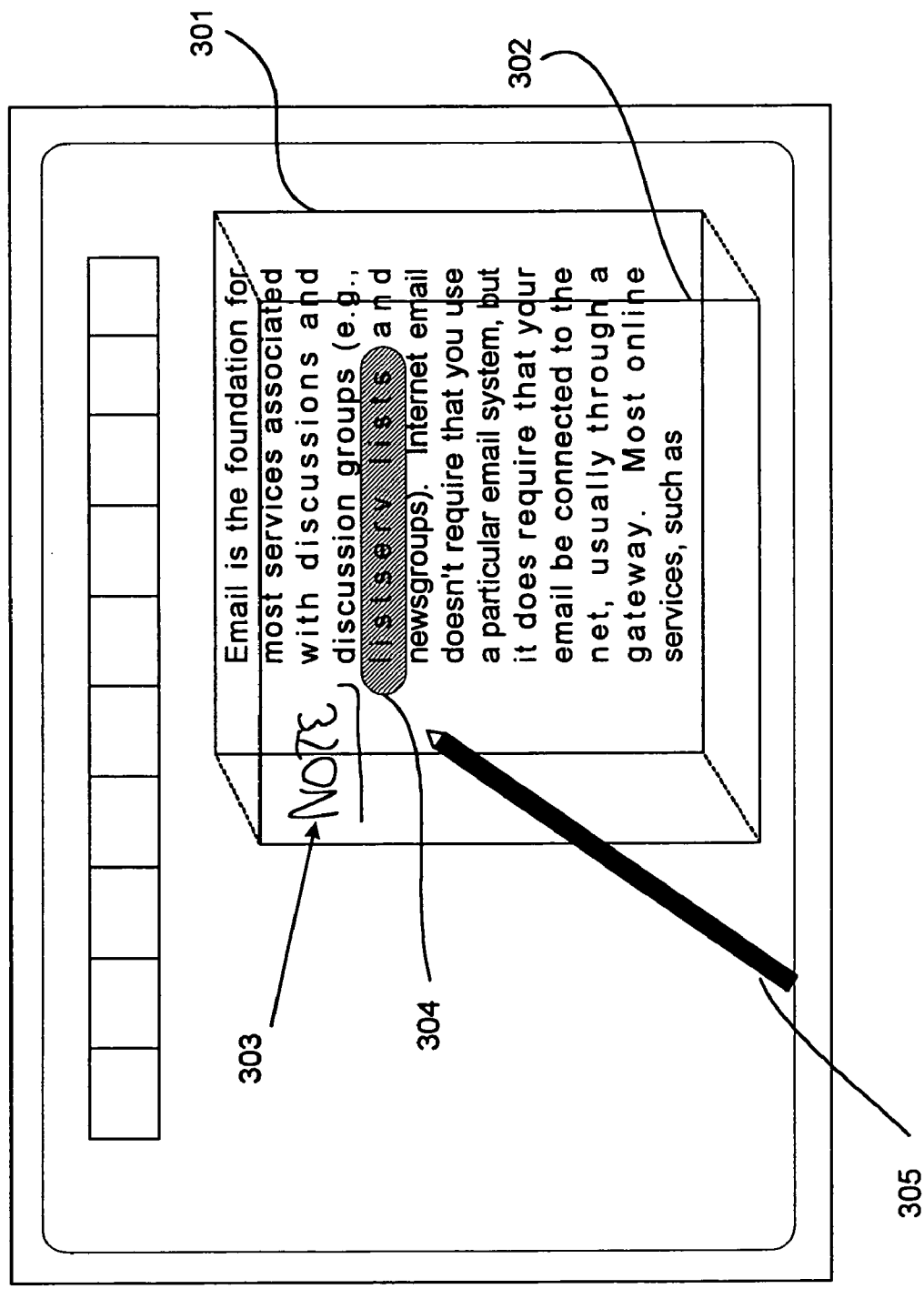
FIG. 3 is a conceptual view showing an ink layer 302 arranged on top of an underlying document page 301. The ink layer may include opaque and translucent markings.

FIG. 3 is a conceptual view showing a computer screen on which a document page 301 is displayed using a document browser. As is conventional, the document page contains text and/or graphics of interest to the user (i.e., "content"). In accordance with the invention, a special "ink" layer 302 is superimposed over the document page 301. Using stylus 305, the user can highlight certain parts of the document 304, which are then shown in a highlighted color (e.g., yellow) against the background text.

Also using stylus 305, the user can mark opaque annotations 303 on the computer display, which appear to be written on the page itself. (Although ink layer 302 is shown as a separate layer in FIG. 3, this view is for conceptual purposes only; the user would see only document page 301 with annotations superimposed over the text and/or graphics on the page). According to one aspect of the invention, annotations made by a user on document page 301 are maintained as a separate "ink" layer 302 that is superimposed over and blended with pixels on the document page. Consequently, even though the annotations appear to be made directly on the underlying document, they are actually maintained in a separate display layer blended with the document page being viewed.

In one embodiment, annotations are specific to each user, such that other users who view the same document will not see a previous user's annotations. This feature can be implemented using log-ins or other user identifiers. For an identical document retrieved at two different remote computers each having the inventive features, annotations made on one remote computer would not show up on the other remote computer, since the annotations are made independently of the document content. It is, however, within the scope of the invention to permit sharing of annotations if desired.

Although the inventive principles are described with respect to a tablet and stylus computer, these principles can be applied to other types of computers, including desktop systems, notebook computers, and the like. Many types of input devices, such as touch-sensitive displays and the like, can be used to indicate those portions of the display that are to be annotated. Moreover, as explained above, many variations on a basic stylus are of course possible, including an embodiment in which the stylus includes a writing end and an "erasing" end.

Figure 4:
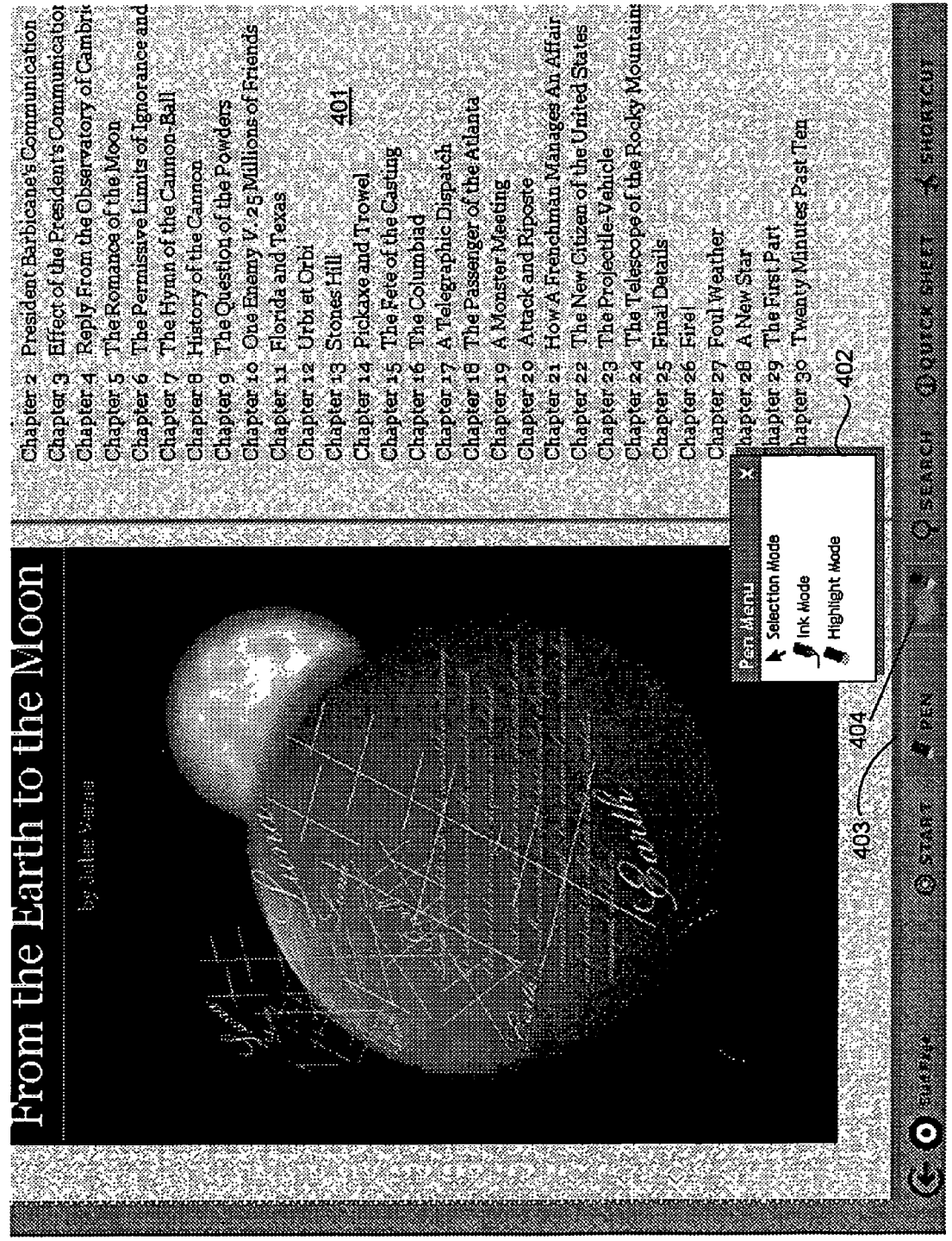
FIG. 4 shows a user interface on a computer screen including a menu 402 that permits a user to select from among a plurality of annotation modes on a displayed document.

FIG. 4 shows a user interface on a computer screen on which a document page 401 is displayed using a document browser. In accordance with one embodiment of the invention, the user interface includes an annotation mode selection menu 402 that permits a user to select from among a plurality of annotation modes for a displayed document. By tapping the stylus on pen button 403, the user can cause the annotation mode selection menu 402 to be displayed. A mode indicator 404 indicates the current annotation mode for the document browser.

According to one variation of the invention, these modes can include an "ink" mode, a "highlight" mode, and an "erase" mode. Additionally, a "selection" mode permits the user to switch to normal browser functions. As shown in FIG. 4, the user interface is already in "erase" mode (indicated by mode indicator 404), so that "erase" is not shown as one of the available modes in menu 402.

It is not necessary to provide an explicit "mode selection" feature as described above; instead, mode selection can be implicit in the manner by which the input device is used. As one example, a stylus could be used to provide an ink mode when the stylus is used as a writing implement; a highlighting mode when the stylus is held a certain way or when a button is pressed on the stylus; and an erase mode when an "erasing" end of the stylus is moved across portions of the display. As another example, one of the modes (e.g., the ink mode) could be established as a default mode when a user input device is manipulated, with other modes being selected based on additional user inputs or manipulations or even voice commands, for example. Many other variations are of course possible.

Figure 5:
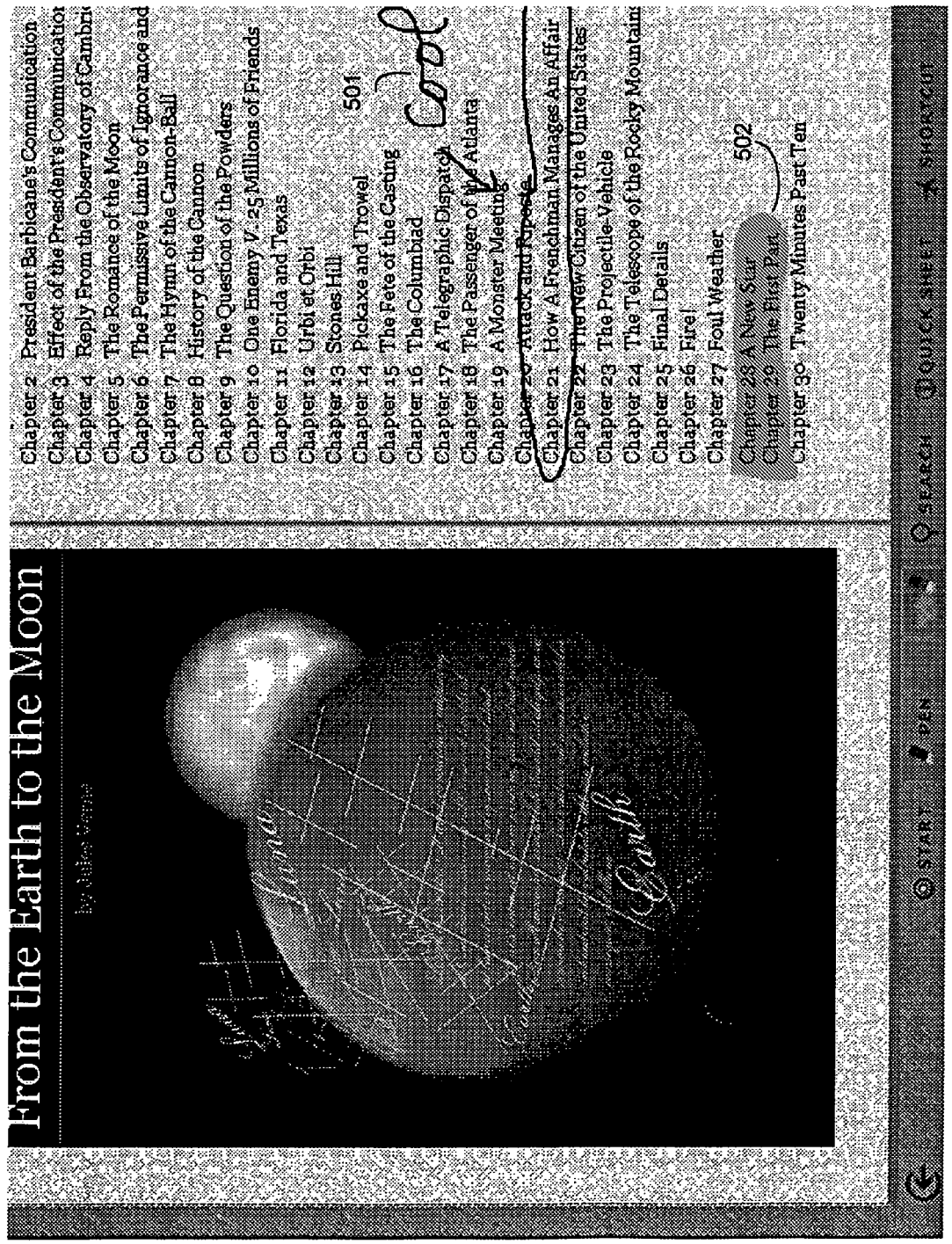
FIG. 5 shows a user interface on a computer screen including an opaque annotation 501 and a highlighted annotation 502, both superimposed over a displayed document.

FIG. 5 shows a user interface on a computer screen including the document of FIG. 4. Using the "ink" mode, the user has annotated a portion of the document 501 with an opaque ink color (e.g., black or blue). The user has also highlighted a different portion of the document 502 using the "highlight" mode. The highlighted portion 502 appears in a translucent color (e.g., yellow) superimposed over the underlying document. Using the "ink" and "highlight" modes, the user is able to annotate pages viewed through the document browser as needed.

Figure 6:
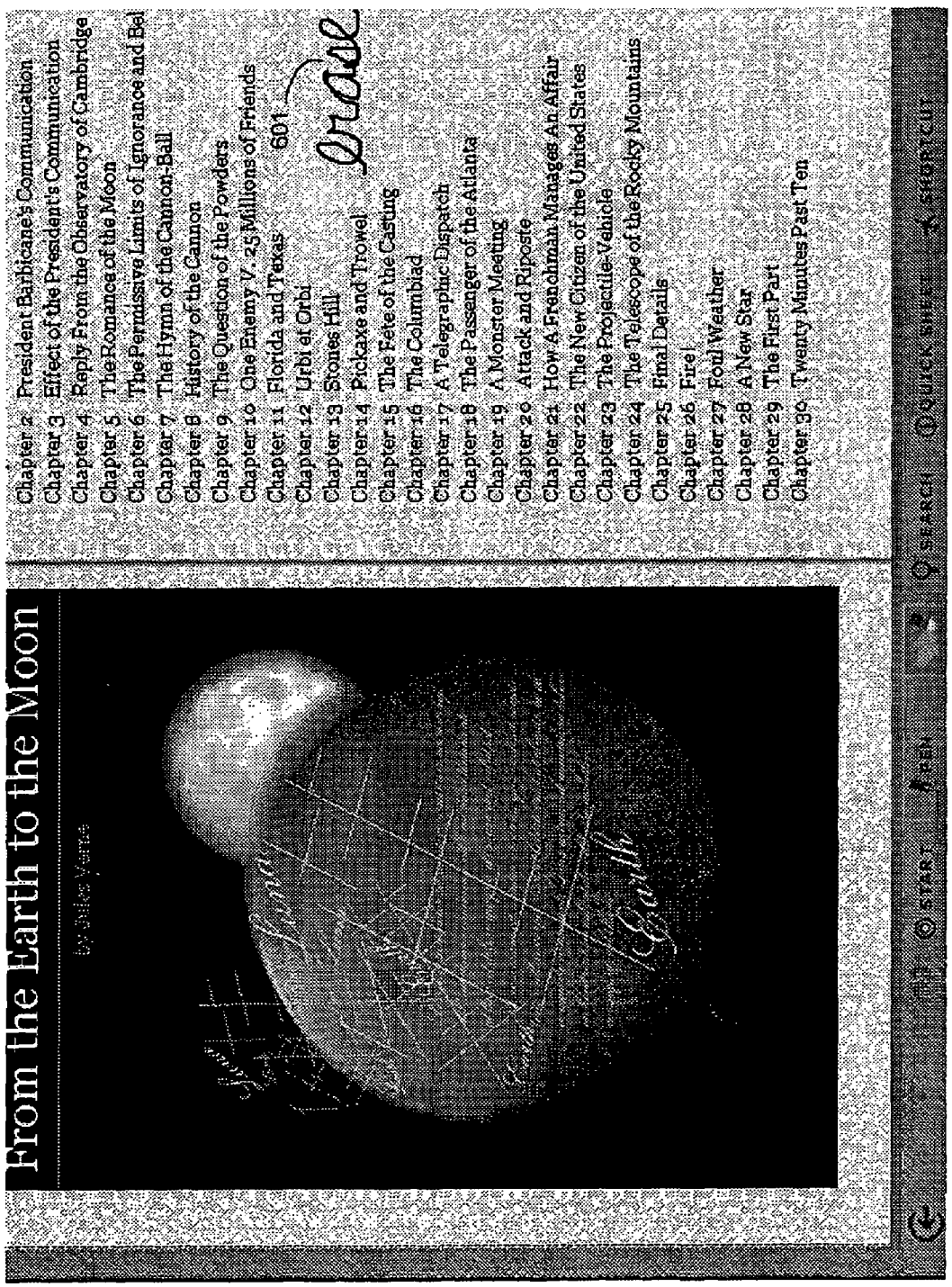
FIG. 6 shows a user interface on a computer screen including an opaque annotation 601 in a pre-erase state.
Figure 7:
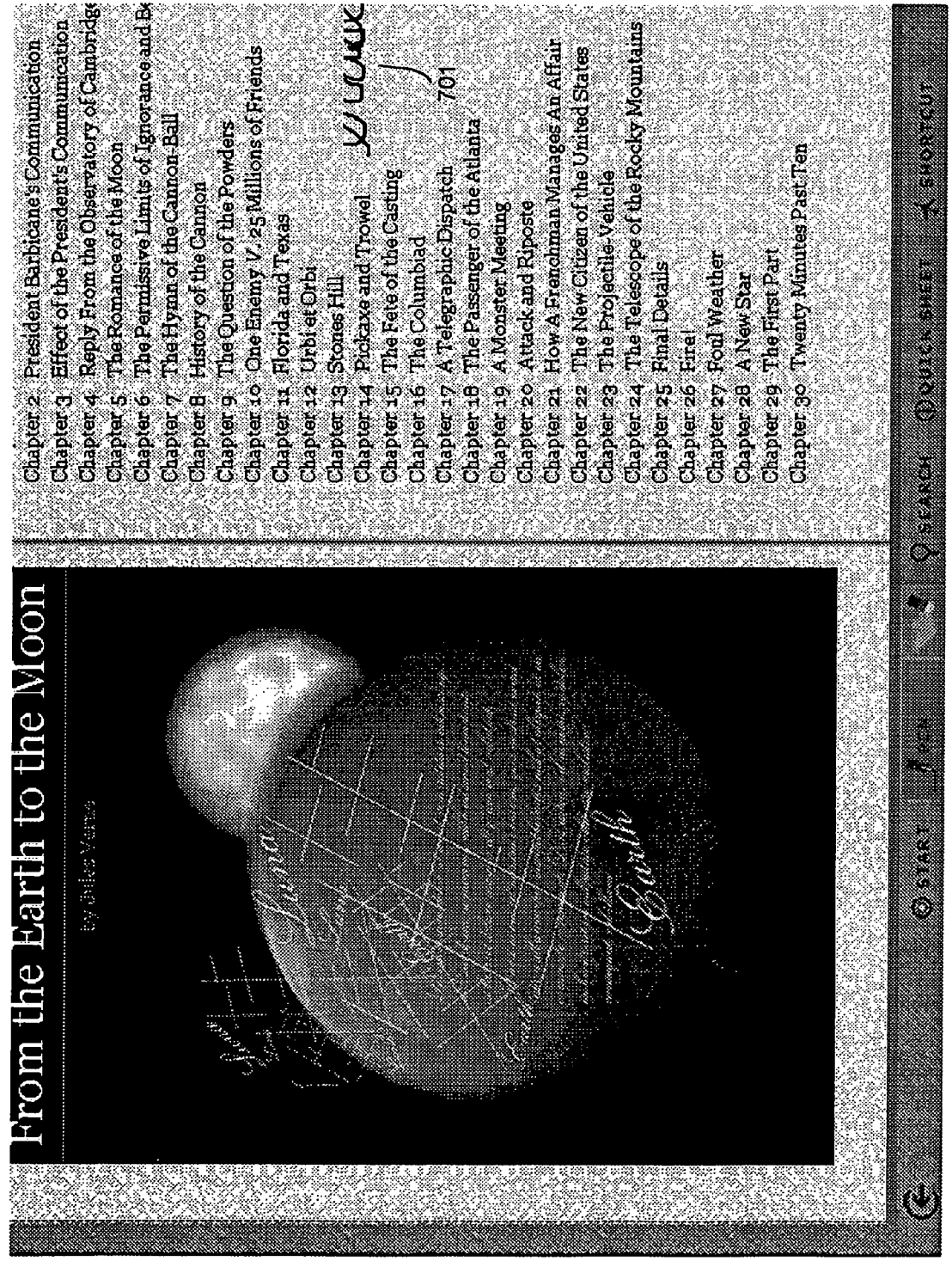
FIG. 7 shows a user interface on a computer screen including an opaque annotation 701 in a post-erase state, where the annotation has been partially erased.

FIGS. 6 and 7 show one possible approach for implementing an "erase" mode. FIG. 6 shows a pre-erase screen in which the user has annotated a document page using an opaque ink color 601. FIG. 7 shows the same screen of FIG. 6 after the user has selected the "erase" mode and moved the stylus across a portion of the annotated region 601, leaving a partially erased annotation 701. Using the "erase" mode, the user can remove previous annotations from the computer screen. The width of the eraser function can be varied to suit various applications, or it can even be user-selectable.

Figure 8:
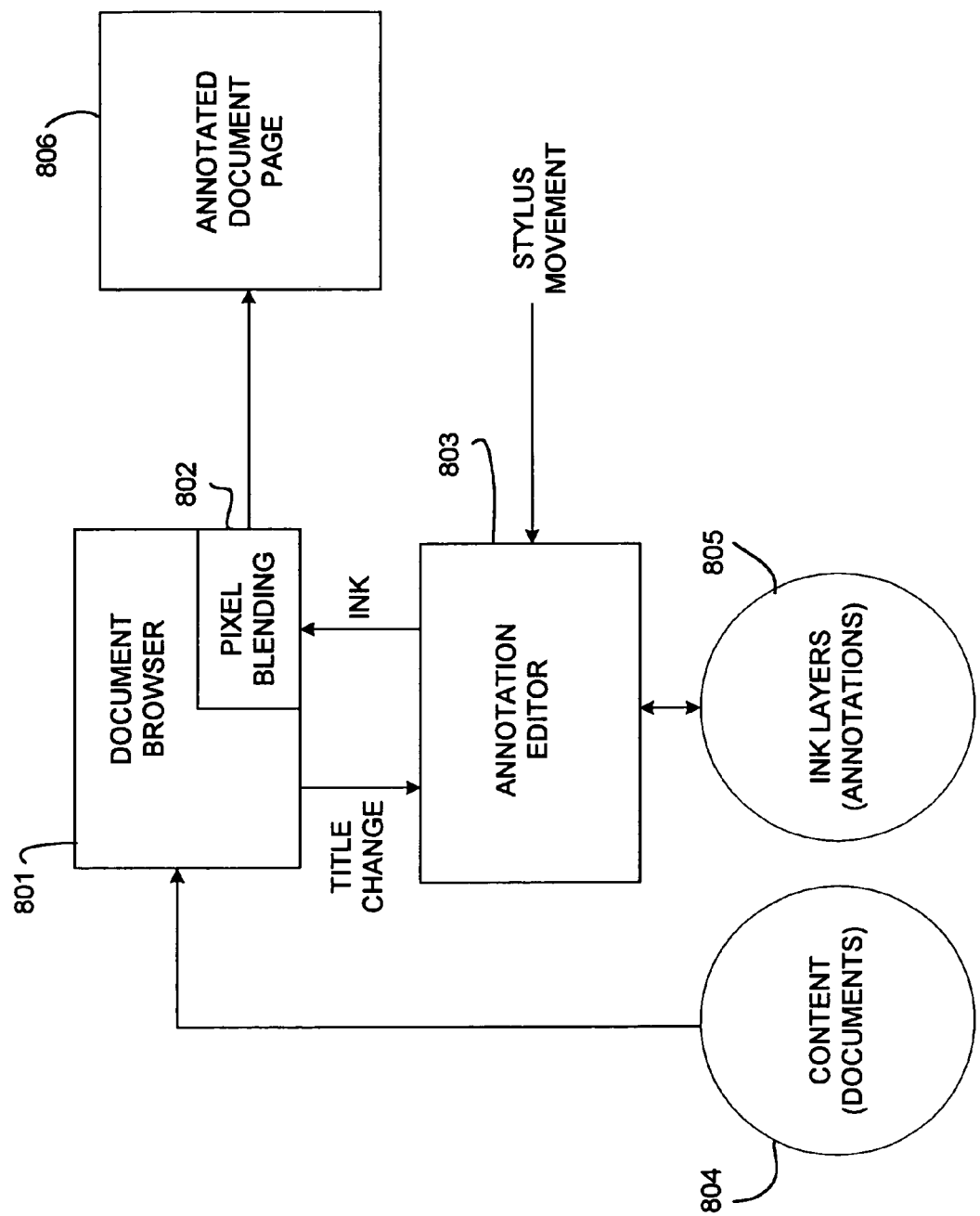
FIG. 8 shows one possible software design for implementing various principles of the invention.

FIG. 8 shows one possible software design for implementing various principles of the invention. As shown in FIG. 8, a document browser 801 permits a user to retrieve and view content in the form of documents from a document storage area 804. The documents can be stored locally on the user's computer (e.g., on CD-ROM disks and the like), or they can be stored remotely and retrieved across a network such as the Internet. Annotation editor 803 retrieves and stores annotations in "ink layers" stored in a storage device or area 805. As with document storage, ink layer storage area 805 can be local or remotely located.

Annotations retrieved from storage area 805 are provided to pixel blending function 802, which is indicated as a newly provided function within document browser 801. Alternatively, pixel blending function 802 can be provided separately (e.g., in the operating system, for example). In general, pixel blending function 802 blends pixels from a document page with corresponding pixels from an annotation or "ink" layer mapped to that document page, and generates a blended pixel image that is displayed as an annotated document page 806.

In one embodiment, each opaque annotation pixel replaces a corresponding pixel on a document page, whereas each translucent annotation pixel (e.g., highlighting) is blended with a corresponding pixel value on a document page to produce a different color from that in the original document. Pixel blending functions such as alpha blending are well known and no further elaboration of this feature is required.

Annotations can be saved as "strokes" in a data structure and stored locally in a file associated with the currently displayed page of the document. Each stroke can comprise a stroke type (e.g., annotate, highlight or erase), a stroke width, and a stroke color in addition to coordinates indicating the stroke trajectory. In various embodiments, annotation storage occurs automatically, such that whenever the input device is released (or lifted), a new stroke is automatically stored.

Alternatively, it is of course possible to store annotations as a bitmap image having the same or similar dimensions as the presently displayed document page, such that the annotation image can be superimposed over the document page. Combinations of these approaches are of course possible. For example, opaque annotations could be stored in a data structure, while highlighting could be stored as a bitmap image.

According to one embodiment, document browser 801 generates a title change event to annotation editor 803 each time a different document page is selected through document browser 801. This permits annotation editor 803 to retrieve previously stored annotations for a page, and to create a new annotation file for a newly displayed page. Annotation editor 803 intercepts stylus movements from a stylus or other cursor movement device and provides them to document browser 801 after any annotation processing has been performed. In one embodiment, browser 801 can constantly generate "screen paint" commands that are intercepted so that a blended image is continuously generated.

Annotation editor 803 can be implemented as an ActiveX® control element, as an Applet, or as other forms of software functions. Annotation editor 803 and any related functions can be embedded into a document viewed through browser 801, such that viewing the document provides the annotation functions.

Figure 9A:
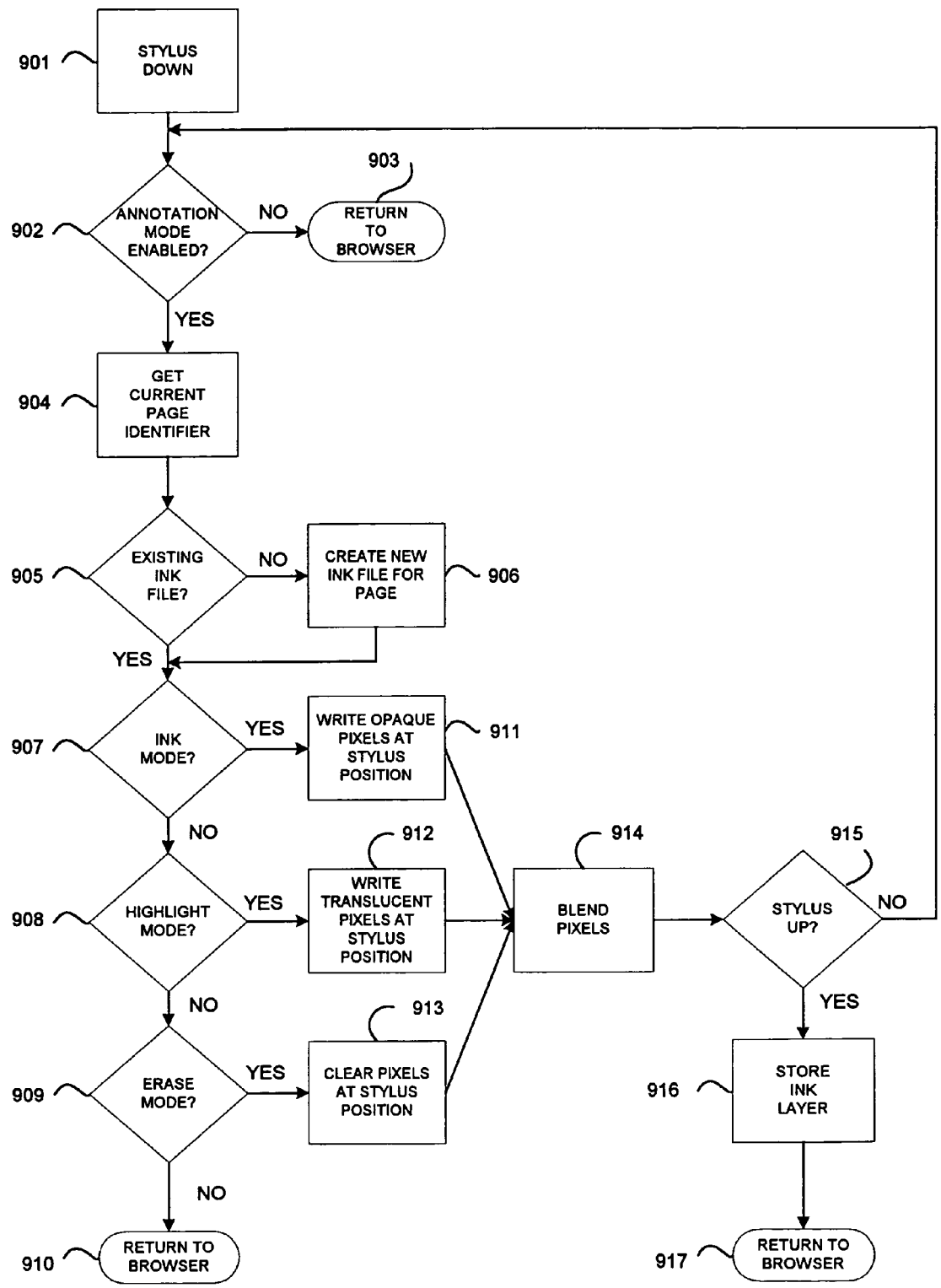
FIG. 9A shows a flowchart indicating various steps that can be executed to provide an annotation function according to certain inventive principles.

FIG. 9A shows a flowchart indicating various steps that can be executed to provide an annotation function according to one embodiment. It will be appreciated that many different approaches for carrying out the inventive principles are possible, and the steps shown are intended to be exemplary only. For example, although the steps are illustrated as being performed sequentially, they can in fact be performed by different components at different times in an object-oriented system using event-driven processing techniques. The steps shown can be implemented in software that is stored on a storage medium such as a disk.

Beginning in step 901, a stylus "down" event is detected. As noted previously, any of various input devices such as a mouse with key clicks or others can be used. In step 902, a test is performed to determine whether the annotation mode has been enabled. (See FIG. 4). If the annotation mode is not presently active, then in step 903 processing returns to the browser (i.e., the stylus movement command is passed through to document browser 801).

In step 904, after it has been determined that the annotation mode is active, the page identifier for the currently displayed page is retrieved. It is contemplated but not necessary that each document page have a unique identifier (e.g., a unique URL). In step 905, a test is performed to determine whether the currently displayed page has a previously existing "ink" or "annotation" file associated therewith. If such an ink file exists, it is retrieved from storage area 805 (see FIG. 8). If no such file exists, a new ink file is created in step 906, preferably using a name that readily corresponds to the displayed document page.

After an ink file has been retrieved or newly created, a test is performed in step 907 to determine whether the annotation mode is "ink" mode. If the current annotation mode is "ink" mode, then in step 911 opaque pixels are written into the ink file at the current stylus position. The number of pixels written can be varied depending on the width or "swath" to be used for the annotation. For a wide swath (e.g., a magic marker type of annotation), a plurality of pixels can be written surrounding the current stylus position. For a narrower swath (e.g., a pinpoint type of annotation), a smaller number of pixels (e.g., one pixel wide) can be written to the annotation file at the current stylus position. It is within the scope of the invention to permit the user to select or change the width of the annotation marks.

In step 914, a pixel blending operation is performed, such that the pixels in the ink file are blended with pixels from the document, which causes the document to be displayed with annotations. (As described above, opaque pixels may entirely replace those in the viewed document). In step 915, a test is performed to determine whether the stylus or other input device has been lifted or disengaged. If so, then in step 916 the ink layer is stored, and processing returns to the browser in step 917. Otherwise, annotations continue at step 902, and can be stored as part of the same stroke. If the user again presses the stylus or input device against the document, then annotations resume in step 901.

Returning to step 907, if the present mode is not "ink" mode, then a test is made in step 908 to determine whether highlight mode was selected. If highlight mode is active, then in step 912 translucent pixels are written at the current stylus position. For example, yellow, pink, or other translucent colors can be stored at the current stylus position. As before, the pixels are blended in step 914, changing the resulting pixels on output but nevertheless permitting the user to see the original document pixels in a modified form. Processing continues as described previously.

In step 908, if highlight mode is not currently active, then in step 909 a test is performed to determine whether erase mode is active. If so, then in step 913 the pixels at the current stylus position are cleared or zeroed out. As with highlight mode, the width of the erasure can be preset to a swath wider than one pixel, and the width can be different than the highlight or annotation pixel width. As before, the remaining non-erased pixels are blended with the original document image in step 914 and processing continues until the ink layer is stored.

Figure 9B:
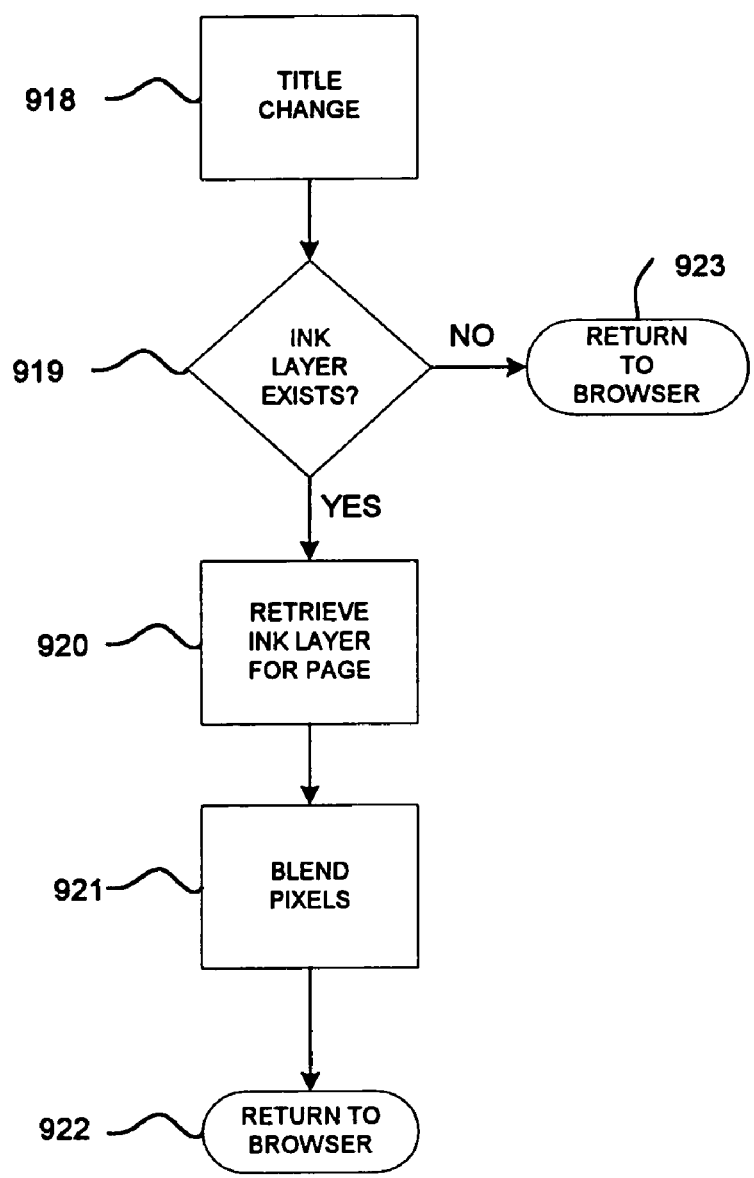
FIG. 9B shows a flowchart indicating how previously created annotations can be superimposed over a document page.

FIG. 9B shows a flowchart indicating how previously created annotations can be superimposed over a document page. In step 918, a title change event is detected in document browser 801, and is sent to annotation editor 803. In various embodiments, a title change event occurs whenever the presently viewed document page changes. This may occur when the user jumps to a new document page, or when the user moves forward or backward among a sequence of related document pages, such as might occur in a book or a set of related hyperlinks. Other types of events, such as a "status change" event, for example, can be used instead of a title change event.

In step 919, a test is performed to determine whether an ink layer already exists for the new document page. If no ink layer exists for the page, processing returns to the document browser at step 923 and the page is displayed normally. If an ink layer exists for the page, then in step 920 the ink layer is retrieved. In step 921, the pixels from the retrieved ink layer are blended with the displayed page and the resulting image appears on the computer display. Thereafter, at step 922 processing returns to the browser. A separate ink layer file can be created for each document page, or one ink file can be created for an entire document and indexed according to pages on which the annotations appear. Other approaches are of course possible.

Thus has been described a system, method, and apparatus for annotating electronic document pages using an annotation editor that stores annotations independently of the content of the underlying document. It will be appreciated that many modifications and variations of the invention are possible, and the scope of the invention is not limited by the specific examples and descriptions herein.

We claim:

1. A computer-implemented method of annotating pages of an electronic document independently of the contents of the document, comprising the steps of:

displaying a page of the electronic document on a computer display device using a document browser that permits a user to move forward and backward among a plurality of document pages;

determining whether the currently displayed page of the electronic document is associated with an existing annotation file that is stored separately from the electronic document;

if the currently displayed page is associated with the existing annotation file, retrieving the separately stored annotation file and displaying annotations corresponding to previously stored annotation stroke data on the computer display device;

if the currently displayed page is not associated with the existing annotation file, creating a new annotation file stored separately from the electronic document;

detecting a selection of an annotation mode that permits the user to annotate the currently displayed document page;

receiving annotation stroke input from a user input device indicating that the user has moved the user input device for a continuous distance about a stroke location on the currently displayed document page;

storing annotation stroke data based on the received annotation stroke input, said annotation stroke data comprising data corresponding to the stroke location and the movement of the user input device, wherein the annotation stroke data is stored in the separately stored annotation file, wherein the stored annotation stroke data corresponds to a translucent highlighting that does not completely obscure the annotated portions of the currently displayed document page;

displaying the translucent highlighting on the computer display device, said displaying comprising blending pixels from the currently displayed document with a translucent color to produce a translucent annotation;

updating the computer display device to display a different page of the currently displayed document;

retrieving previously stored annotation stroke data associated with the different page; and displaying annotations corresponding to the previously stored annotation stroke data on the computer display device superimposed over the different page.

2. The computer-implemented method of claim 1, wherein the stored annotation stroke data corresponds to an erase highlighting that erases previously annotated areas of the currently displayed document page.

3. The computer-implemented method of claim 1, wherein said user input device comprises a stylus in a tablet computer system.

4. The computer-implemented method of claim 1, further comprising detecting a title change event in the document browser and, in response thereto, locating a second annotation file corresponding to the different document page.

5. The computer-implemented method of claim 1, wherein the annotation stroke data is stored in a data structure.

6. The computer-implemented method of claim 5, wherein the annotation stroke data comprises a stroke width and coordinates indicating a trajectory of the stroke.

7. The computer-implemented method of claim 1, wherein the annotation stroke data is stored as a bitmap image.

8. The computer-implemented method of claim 1, wherein said annotation file contains a user identifier associated with the user.

9. The computer-implemented method of claim 1, wherein access permissions on the annotation file are set to allow the user access to the annotations while denying access to certain other users.

10. The computer-implemented method of claim 1, wherein blending the pixels comprises execution of an alpha blending function.

11. The computer-implemented method of claim 1, wherein the annotation stroke data corresponds to movement of a stylus across the display between a stylus down event and a stylus up event.

12. A system for annotating electronic documents independently of the content of the documents comprising:

a computer display device;

a computer programmed with a document browser that permits a user to display an electronic document on the computer display device and to move forward and backward among a plurality of document pages;

a computer input device that permits the user to indicate portions of a currently displayed document page; and computer software that:

determines whether the currently displayed document page is associated with an existing annotation file that is stored separately from the electronic document, wherein if the currently displayed document page is associated with the existing annotation file, the computer software retrieves the separately stored annotation file and displays annotations corresponding to previously stored annotation stroke data on the computer display device, and wherein if the currently displayed page is not associated with the existing annotation file, the computer software creates a new annotation file stored separately from the electronic document;

permits the user to annotate parts of the currently displayed document page according to indicated portions of the currently displayed document, wherein the computer software displays the annotated parts of the currently displayed document page on the computer display device and stores annotations made by the user in the separately stored annotation file, wherein the computer software displays and stores translucent highlight annotations that do not completely obscure annotated portions of the currently displayed document page, said displaying comprising blending pixels from the currently displayed document with a translucent color to produce a translucent annotation;

updates the computer display device to display a different page of the currently displayed document;

retrieves previously stored annotation stroke data associated with the different page; and displays annotations corresponding to the previously stored annotation stroke data on the computer display device superimposed over the different page.

13. The system of claim 12, wherein the computer software displays and stores erased annotations that remove previously made annotations on the currently displayed document page.

14. The system of claim 12, wherein the computer display device comprises a flat panel display, and wherein the computer input device comprises a stylus.

15. The system of claim 12, wherein the computer software retrieves, upon detecting a title change event, previously stored annotations associated with a different document page and displays the previously stored annotations on the different document page.

16. The system of claim 12, further comprising an annotation mode selection menu.

17. The system of claim 12, wherein annotations are stored in a data structure as strokes.

18. The system of claim 12, wherein annotations are stored as a bitmap image.

19. A computer-readable storage medium comprising computer-executable instructions for performing steps comprising:

displaying an electronic document page on a computer display device and permitting a user to move forward and backward among a plurality of document pages;

determining whether the currently displayed page of the electronic document is associated with an existing annotation file that is stored separately from the electronic document;

if the currently displayed page is associated with the existing annotation file, retrieving the separately stored annotation file and displaying annotations corresponding to previously stored annotation stroke data on the computer display device;

if the currently displayed page is not associated with the existing annotation file, creating a new annotation file stored separately from the electronic document;

detecting a selection of an annotation mode that permits the user to annotate the currently displayed document page;

receiving annotation stroke input from a user input device to indicating that the user has moved the user input device for a continuous distance about a stroke location on the currently displayed document page;

storing annotation stroke data based on the received annotation stroke input, said annotation stroke data comprising data corresponding to the stroke location and the movement of the user input device, wherein the annotation stroke data is stored in the separately stored annotation file, wherein the stored annotation stroke data corresponds to a translucent highlighting that does not completely obscure the annotated portions of the currently displayed document page;

displaying the translucent highlighting on the computer display device, said displaying comprising blending pixels from the currently displayed document with a translucent color to produce a translucent annotation;

updating the computer display device to display a different page of the currently displayed document;

retrieving previously stored annotation stroke data associated with the different page; and displaying annotations corresponding to the previously stored annotation stroke data on the computer display device superimposed over the different page.

20. The computer-readable storage medium of claim 19, wherein the stored annotation stroke data corresponds to an erase highlighting for erasing portions of previously created annotations.

21. The computer-readable storage medium of claim 19, wherein the annotation stroke data is stored in a data structure.

22. The computer-readable storage medium of claim 19, wherein the annotation stroke data is stored as a bitmap image.

* * * * *